Dec. 26, 1933. W. M. WALKER 1,940,925
OIL BRAKE
Filed June 29, 1932 2 Sheets-Sheet 1
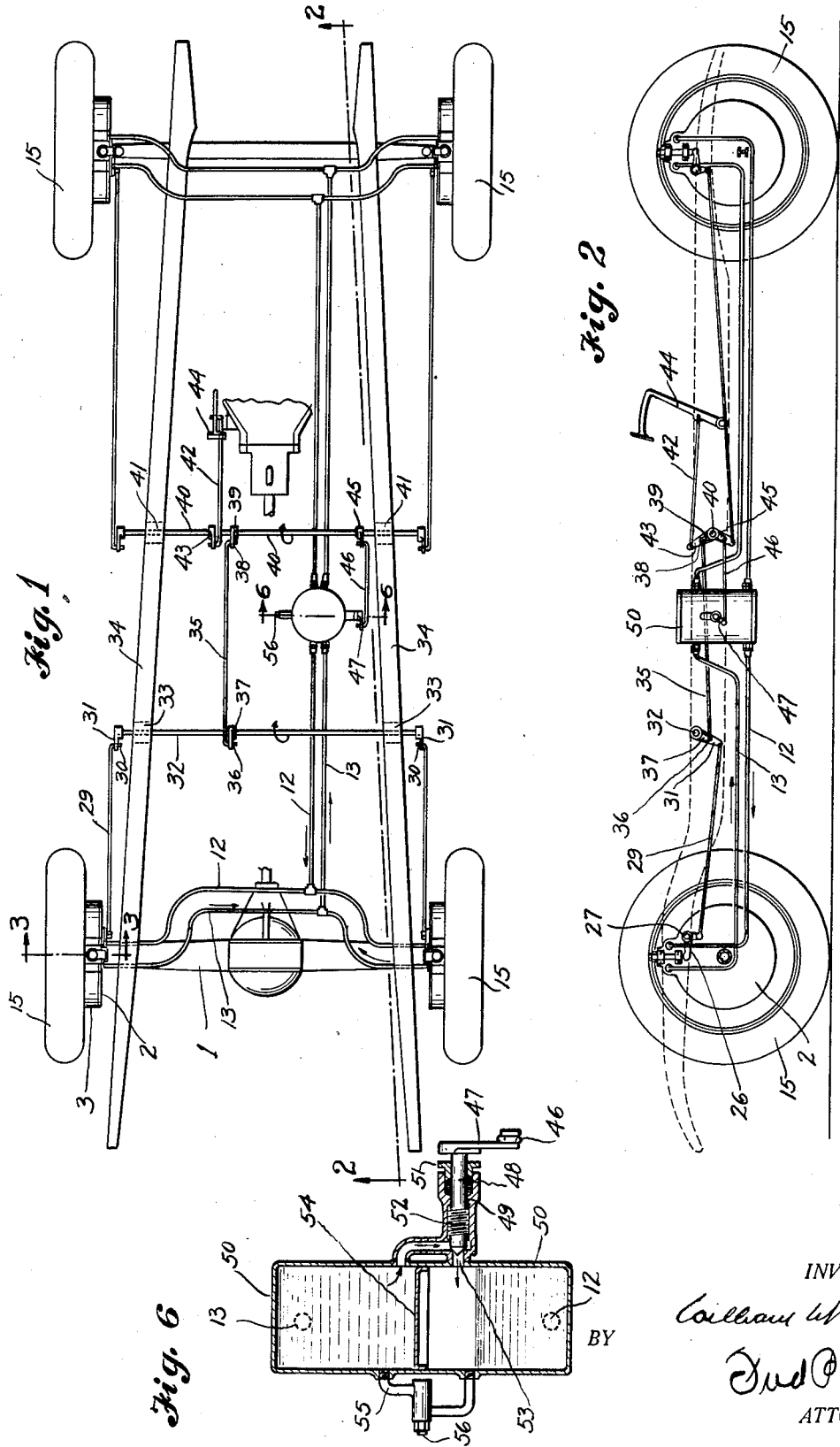
INVENTOR.
William W Walker
BY
Fred P. Goin
ATTORNEY.

Dec. 26, 1933.     W. M. WALKER     1,940,925
OIL BRAKE
Filed June 29, 1932     2 Sheets—Sheet 2
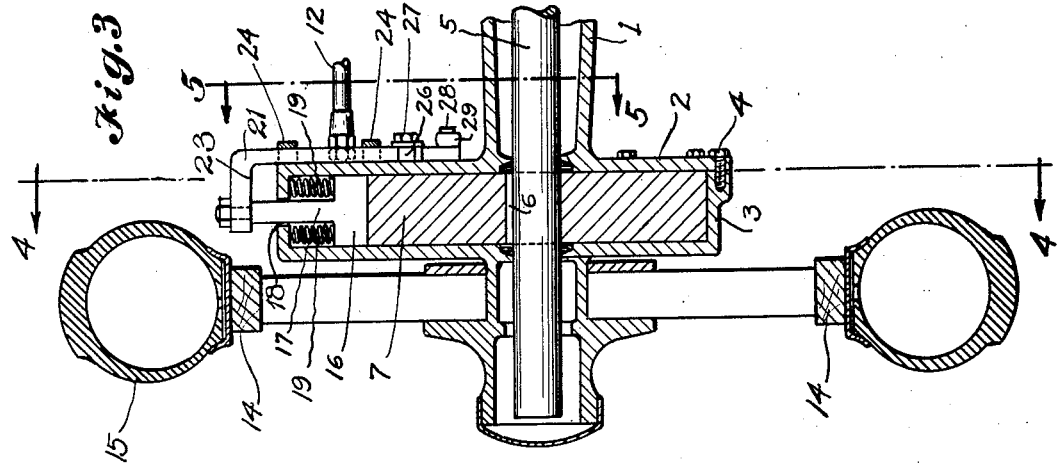
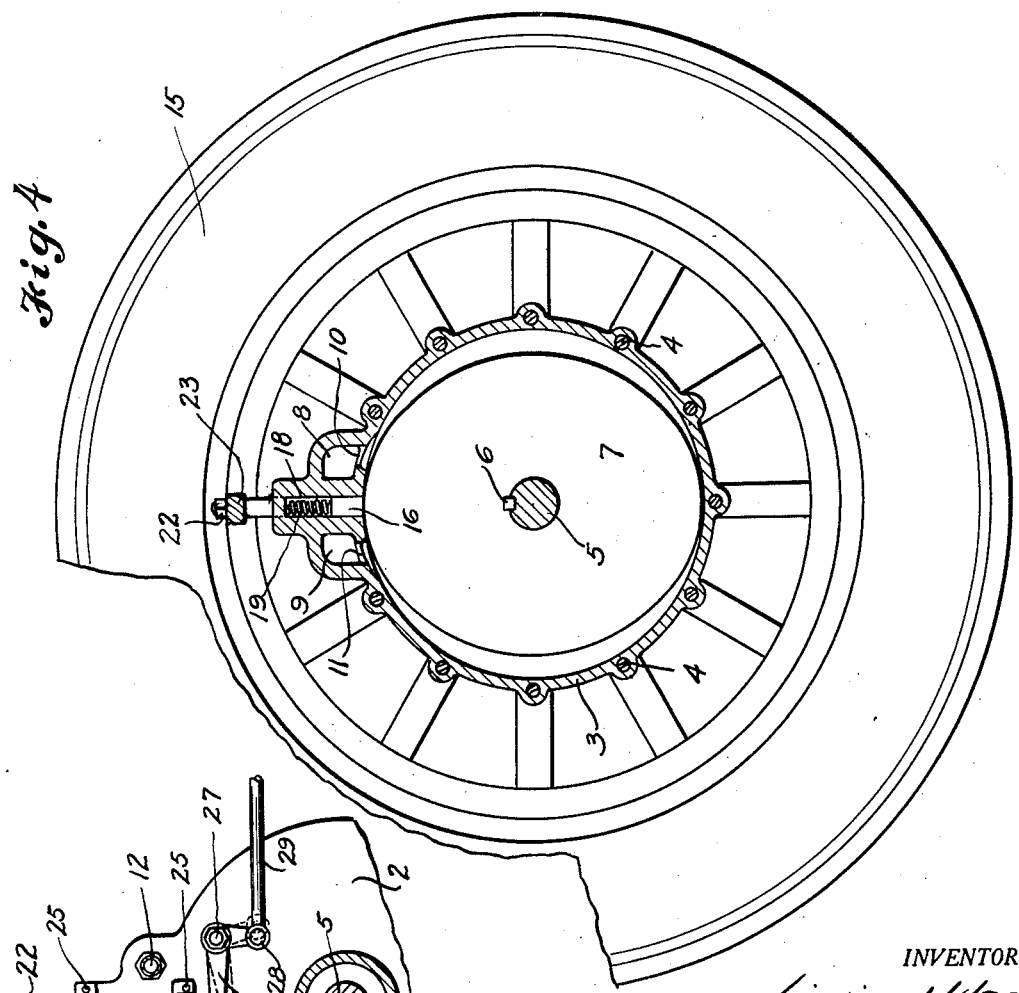
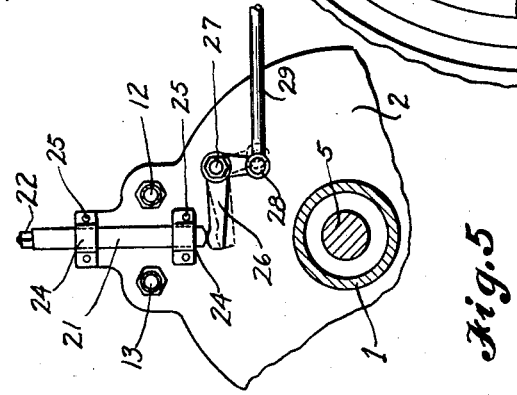
INVENTOR.
William M. Walker
BY
Fred P. Goin
ATTORNEY.

Patented Dec. 26, 1933

1,940,925

UNITED STATES PATENT OFFICE 1,940,925

OIL BRAKE

William M. Walker, Bremerton, Wash.

Application June 29, 1932. Serial No. 619,837

2 Claims. (Cl. 188—90)

This invention relates to improvements in brakes and more particularly to brakes adapted for use on power driven vehicles. An important feature of the invention is that the brake is automatically released or applied by hydraulic means through connections between the usual foot brake and the pipes through which the oil or other fluid circulates.

I accomplish these and other features and objects by the peculiar arrangement and combination of the parts as will be more clearly explained in the following specification, shown in the accompanying drawings, and finally pointed out in the appended claims.

In the drawings:

Fig. 1 is a plan view of a chassis with my device installed.

Fig. 2 is a section upon the line 2—2 of Fig. 1.

Fig. 3 is a section upon the line 3—3 of Fig. 1 and shows the oil brake only.

Fig. 4 is a section upon the line 4—4 of Fig. 3.

Fig. 5 is a fragmentary view upon the line 5—5 of Fig. 3.

Fig. 6 is a section upon the line 6—6 of Fig. 1, showing the needle valve in closed position.

Referring more particularly to the drawings, reference numeral 1 indicates the usual housing for the rear axle of an automobile, to which is secured a plate 2. 3 is a cup member to which the plate is secured by means of bolts 4. 5 indicates the usual rear axle which is secured, by means of key 6, to an elliptical disk 7. Chambers 8 and 9 are cored out or otherwise formed in the wall of the cup. Openings 10 and 11 cause these chambers 8 and 9 to respectively communicate with the interior of the cup. 12 is one end of an oil intake pipe which communicates with chamber 8. 13 is an oil discharge pipe which communicates with chamber 9. 14 indicates the usual traction wheels and 15 the usual pneumatic tires. 16 is a plunger reduced at 17, the reduced portion being slidable within an aperture 18 in a wall of the cup. 19 are springs which thrust against the wall of the cup and the enlarged portion of the plunger 17. The reduced portion 17 of the plunger is rigidly secured to an arm 21 by means of a nut 22, the extreme upper end of the reduced portion 17 being still further slightly reduced to form a shoulder 23, and suitably threaded to receive the nut 22. The arm 21 is slidable within bearings 24 secured to the plate 2 as by rivets 25. The lower end of the arm 21 contacts with one leg of a bell crank 26 pivotally mounted upon the plate 2 by nut and bolt means as indicated at 27. The other leg of the bell crank is pivotally connected by a rivet 28 to one end of a rod 29. The opposite end of this rod is pivotally connected at 30 to one leg of a lever 31 rigidly secured to a shaft 32 rotatably mounted in bearing 33 secured to the chassis 34. 35 is a rod one of whose ends is pivotally connected as at 36 to a lever 37. The lever 37 is rigid with the shaft 32. The opposite end of the rod 35 is pivotally connected at 38 to a lever 39. The lever 39 is rigidly secured to a cross shaft 40, rotatably mounted in bearings 41 upon the chassis. 42 is a rod pivotally connected at one end to lever 43 on shaft 40 and having its opposite end similarly connected to the usual foot brake 44. 45 is a lever rigidly connected to the cross rod 40 and pivotally connected to the lever is a rod 46. This rod is also connected at one of its ends to a lever 47 on which is formed a needle valve 48 rotatable in a hollow bearing 49, rigid with an oil supply tank 50. Needle valve 48 passes through a gland 51. The inner end of the needle valve is threaded as at 52 so that it may be advanced or retracted within its bearing 49. The needle valve fits in an opening 53 in the wall of the tank 50, as will be understood. The supply tank 50 is divided into upper and lower compartments by a wall 54. The discharge pipe 13 communicates with the upper chamber of the tank. The hollow bearing 49 constitutes a bypass from the upper chamber to the lower chamber of the supply tank. 55 is another by-pass from the upper to the lower chamber of the supply tank 50. However, oil is normally prevented from flowing from the upper to the lower chamber of the tank by means of any approved form of blow-off valve, the stem of which is indicated at 56. Each of the four traction wheels 14 is equipped as shown in Figs. 3, 4, and 5 in identically the same manner, and each of the equipments is connected by pipes and rods as shown in the said figures, and already described.

The operation of the device is that when it is desired to produce braking action on the traction wheels all that is necessary for the operator to do is to press upon the foot brake 44 as usual, which causes the needle valve to move to its closed position, through the action of the train of parts including rod 42, lever 43, lever 39, rod 35, lever 37, lever 31, rod 29, one leg of bell crank 26, and the other leg of the bell crank, which at this point will be moved from its full line position to its dotted line position in Fig. 5. The needle valve 48 normally is open or in unseated position. Therefore, when the foot brake is operated as just indicated, the needle valve begins to move from its normal open position to its closed position, as seen in Fig. 6, through the connections between the foot brake and the lever 47, as already described. As pressure is continued upon the foot brake the needle valve will finally move to its closed position as seen in Fig. 6. The leg of the bell crank 26 having been now caused to drop to its dotted line position as already described, its controlling spring 19 is then free to urge the plunger 16 downwardly as soon as the elliptical disk 7 passes from its position as seen in Fig. 4 in clockwise direction, which it will do due to the rotation of the traction wheels, and will continue to hug the periphery of the disk 7 at all times. Just as soon as the disk 7 rotates from its Fig. 4 position, oil is permitted to flow from the chamber 8 through the opening 10 into the space between the disk 7 and the inner wall of the cup 3, upon the right hand side of the center only. It will be understood that normally the space between the periphery of the disk 7 and the inner wall of the cup 3 is filled with oil and when no braking action occurs the disk 7 will rotate idly within the oil in the cup except for the slight resistance offered by the inertia of the oil and its friction with the containing parts as it is moved by said disk. When oil is allowed to flow through the opening 10 as just described, the oil between the disk 7 and the wall of the cup 3 on the left hand side of the center of Fig. 4 is immediately caused to discharge through opening 11, chamber 9 and discharge pipe 13, and finally into the upper chamber of the supply tank 50. The needle valve being now closed the oil can not pass from the upper chamber of the supply tank 50 into the lower chamber, thus stopping the flow of oil, and, due to the incompressible nature of the oil no further rotation of the disk 7 is possible. Neither is any further rotation of the traction wheels possible.

It is clear that the braking action just described need not be sudden unless in extreme emergency. It will also be clear that if, in such emergency, full braking action be brought suddenly about the oil from the upper chamber of the supply tank 50 can prevent sudden stopping of the oil, which would otherwise occur due to the escapement of the oil through the safety valve.

While I have shown and described a particular form of embodiment of my invention, I am aware that many minor changes will readily suggest themselves to those skilled in the art without departing from the spirit and scope of my invention. I, therefore, desire to avoid being limited to the particular form of embodiment which I have hereinabove shown and described. Having described my invention, what I claim as new, and desire to protect by Letters Patent, is:

1. The combination with a power driven vehicle of a brake, including a foot pedal, a cup circular in cross section secured to a part of the vehicle, an elliptical disk revoluble within the cup and whose greater length is equal to the internal diameter of the cup, means for securing the disk to an axle of the vehicle, an oil supply tank, a partition which divides the tank into separate chambers, a pipe connecting one of the chambers with the cup, another pipe connecting the other chamber with the cup, a normally open by-pass which connects one of the chambers with the other chamber, a valve adapted to close the by-pass, and connections between the valve and the foot pedal whereby an increasing pressure upon the foot pedal will cause a corresponding closure of the by-pass.

2. The combination with a vehicle of a brake, including a foot pedal, a fluid containing casing, means in said casing rotatable with the wheels of the vehicle for placing the fluid under pressure, a fluid supply tank, a partition which divides the tank into separate chambers, pipes connecting each of the chambers with the casing, a normally open by-pass which connects one of the chambers with the other, and a valve connected to said foot pedal, whereby an increasing pressure upon the foot pedal will cause a corresponding closure of the by-pass.

WILLIAM M. WALKER.